US012643970B2

(12) United States Patent
Flores Penalba et al.

(10) Patent No.: US 12,643,970 B2
(45) Date of Patent: Jun. 2, 2026

(54) CURABLE POTTING COMPOSITION FREE OF SUBSTANCES OF VERY HIGH CONCERN

(71) Applicant: Henkel AG & Co. KGaA, Duesseldorf (DE)

(72) Inventors: Sonia Flores Penalba, Cerdanyola de Valles (ES); Diego-Javier Barrios Antúnez, Montmelo Barcelona (ES); Mari Carmen Royo Reverter, Barcelona (ES); Asta Sakalyte, Sant Salvador (ES); Jose Garcia Miralles, Duesseldorf (DE); Rosa Maria Sebastián Pérez, Ripollet (ES); Jorge Marquet Cortés, Barcelona (ES)

(73) Assignee: HENKEL AG & CO. KGaA, Duesseldorf (DE)

( * ) Notice: Subject to any disclaimer, the term of this patent is extended or adjusted under 35 U.S.C. 154(b) by 731 days.

(21) Appl. No.: 17/949,558

(22) Filed: Sep. 21, 2022

(65) Prior Publication Data

US 2023/0025080 A1 Jan. 26, 2023

Related U.S. Application Data

(63) Continuation of application No. PCT/EP2021/056921, filed on Mar. 18, 2021.

(30) Foreign Application Priority Data

Mar. 30, 2020 (EP) .................................... 20382247

(51) Int. Cl.
*C08F 222/10* (2006.01)
*C08K 3/36* (2006.01)

(52) U.S. Cl.
CPC ............ *C08F 222/104* (2020.02); *C08K 3/36* (2013.01)

(58) Field of Classification Search
CPC ................................ C08F 222/10; C08K 3/36
USPC ......................................................... 524/599
See application file for complete search history.

(56) References Cited

U.S. PATENT DOCUMENTS

| | | | | |
|---|---|---|---|---|
| 4,408,018 | A | 10/1983 | Bartman et al. | |
| 6,462,108 | B1 | 10/2002 | Ruyters et al. | |
| 7,514,528 | B2 | 4/2009 | Kauffman et al. | |
| 8,013,368 | B2 | 9/2011 | Bohr | |
| 2003/0162904 | A1 | 8/2003 | Lachowicz et al. | |
| 2005/0081994 | A1 * | 4/2005 | Beckley ................. | C08G 61/12 525/50 |
| 2007/0173602 | A1 | 7/2007 | Brinkman et al. | |
| 2009/0283213 | A1 | 11/2009 | Moeller et al. | |
| 2010/0298467 | A1 | 11/2010 | Stammer et al. | |

FOREIGN PATENT DOCUMENTS

| | | | | |
|---|---|---|---|---|
| CN | 106714944 | A | 5/2017 | |
| EP | 1435383 | A1 | 7/2004 | |
| EP | 1323760 | B1 | 5/2008 | |
| EP | 1283235 | B1 | 1/2014 | |
| JP | H08259672 | A | 10/1996 | |
| JP | 2003212975 | A | 7/2003 | |
| JP | 2017533088 | A | 11/2017 | |
| WO | 2014052644 | A1 | 4/2014 | |
| WO | 2015047584 | A1 | 4/2015 | |
| WO | 2016054367 | A1 | 4/2016 | |
| WO | 2016054380 | A1 | 4/2016 | |
| WO | 2018152194 | A1 | 8/2018 | |
| WO | WO-2019120923 | A1 * | 6/2019 | ........... B01D 63/023 |

OTHER PUBLICATIONS

Ali Osman Konuray et al: "Sequential dual curing by selective Michaeladdition and free radical polymerization of acetoacetate-acrylatemethacrylatemixtures", European Polymer Journal, vol. 98, Jan. 1, 2018 (Jan. 1, 2018), pp. 39-46, XP055635428,GBISSN: 0014-3057, DOI: 10.1016/j.eurpolymj.2017.11.003.

DIN 53240-2, Determination of hydroxl value—Part 2: Method with catalyst, Nov. 2007, 8 pages.

DIN 55672-3, Gel permeation chromatography (GPC)—Part 3: Water as eluent, Aug. 2007, 27 pages.

* cited by examiner

*Primary Examiner* — Deve V Hall
(74) *Attorney, Agent, or Firm* — Sun Hee Thomas

(57) ABSTRACT

The present invention relates to a curable potting composition based on acetoacetate, and to its use in electronic devices. In particular, the present invention relates to a curable potting composition based on multifunctional acetoacetate and multifunctional (meth)acrylate.

12 Claims, No Drawings

CURABLE POTTING COMPOSITION FREE OF SUBSTANCES OF VERY HIGH CONCERN

The present invention relates to a curable potting composition based on acetoacetate, and to its use in electronic devices. In particular, the present invention relates to a curable potting composition based on multifunctional acetoacetate and multifunctional (meth)acrylate.

Potting materials are permanent protective solutions for electronic devices. Materials used in high temperature applications require thermal stability, high glass transition temperature and low coefficient of thermal expansion. Current methods rely on epoxy resins cured with anhydride or amine hardeners. However, such hardeners typically contain Substances of Very High Concern (SVHC) and Carcinogenic, Mutagenic and Reprotoxic (CMR) compounds.

For example, U.S. Pat. No. 6,462,108 B1 discloses an epoxy based potting composition showing high glass transition temperature (Tg), low coefficient of thermal expansion (CTE) and low curing shrinkage. However, the anhydride hardeners used are considered SVHC. More specifically, methylhexahydrophthalic anhydride (MHHPA) used in the examples is classified as a systemic health hazard by REACH.

Therefore, efforts have been made to find safer alternatives to current methodologies which are free of such hazardous compounds.

WO 2016/054367 A1 discloses a multi-pack solvent-free curable composition used for hollow fiber filtration potting applications. It aims to offer the cured potting material a resistance to chemicals such as cleaning/sanitizing reagents. However, the composition would not be suitable for electronics potting because the potting material exhibits a lower glass transition temperature.

WO 2016/054380 discloses multi-pack, solvent-free, room temperature curable, isocyanate-free formulations used as adhesives for spiral wound filtration applications. Hardness (Shore A), gel time, chemical resistance and bubble formation were evaluated. However, glass transition temperatures of the material are not reported.

WO 2014/052644 discloses a carbon-Michael compound used in high temperature applications to reduce heat transfer between materials. For this, the carbon-Michael compound is located between a heat provider and heat acceptor. The heat provider can have temperatures from 100° C. to 290° C. The material can be in the form of a foam, for this reason surfactant additives are introduced in the formulations. Also, hazardous DBU is used as catalyst. Onset degradation temperatures by thermogravimetric analysis (TGA) and storage moduli by dynamic mechanical analysis (DMA) are provided. However, the glass transition temperatures of the material are not reported.

WO 2015/047584 A1 discloses a thermosetting, elastomeric joining composition for cable joining are described comprising multifunctional Michael donors and acceptors. Michael acceptor groups described are based on polyether polyols caped with polyisocyanate compounds which are further reacted with hydroxy ethyl acrylate. The resulting acrylate based on PU is reacted in AATMP in presence of DBU as catalyst. This patent uses hazardous materials such as isocyanates and DBU, which are toxic. The curing is done at room temperature without additional heat applied and over a relatively long time (around 2 days). Gel-times, water absorption, glass transition temperature (from −53 to 90° C.) and weight loss (3.5-7.1%) are reported.

In addition, strongly basic inorganic salts, which could compromise the final stability of the materials due to hydrolysis of the ester bonds, have been reported to be used as catalysts. For example, U.S. Pat. No. 4,408,018 B discloses to use strongly basic salts (NaOH, KOH, EtOH and TBAOH) in presence of solvent to catalyze the Michael addition. EP 1 283 235 B1 reports the use of solvent based Michael addition compositions for laminate adhesives. Sodium ethoxide in ethanol is used as catalyst and peel strength are measured. EP 1 435 383 A1 discloses the use of Michael addition composition in laminates, foams and elastomers. Peel strength are measured as well as Tg (maximum Tg reported is 33° C.). U.S. Pat. No. 7,514,528 B2 discloses to use aqueous solutions of KOAc as catalysts in Michael addition, and the peel strengths and pot lives were measured. U.S. Pat. No. 8,013,368 B2 teaches to use sodium ethoxide in ethanol catalyzed Michael addition for laminates. T-peel test were performed.

EP 1 323 760 B1 describes phosphines as suitable catalysts for crosslinking reactions between compounds containing $\alpha,\beta$-unsaturated carbonyl groups and CH-acidic methylene groups. Trialkylphosphines are used and in particular trioctylphosphine (TOP) was compared with the commonly used DBU which is toxic, giving TOP a much better stability. Acetoacetates and malonates are cured with acrylates. Pot-life, solvent resistance, pencil hardness and yellowing are evaluated. Tg values of the material are not reported.

US 2009/0283213 discloses a two-component bonding system that can be crosslinked by Michael reaction. A mixed resin is synthetized with ethyl malonate and polyol (neopentyl glycol) to make a polyester polyol (OH terminated malonate-polyester). The obtained polyester is reacted with MDI and then with hydroxyacrylate to obtain acrylate terminated chains. DBN dissolved in ethyl acetate is used as catalyst. In this case, the same molecule contains the Michael donor and Michael acceptor. The catalyst containing component is added on the other component, obtaining an elastic film. This patent uses hazardous isocyanates and volatile organic compounds as solvent.

It is therefore an object of the present invention to provide a safer alternative based on Michael addition to the systems currently used in electronic potting.

This object is solved by curable potting composition, comprising a multifunctional acetoacetate compound, a multifunctional (meth)acrylate compound in present of catalyst and a filler, whose potting product has good thermal properties, high glass transition temperature, low warpage and low coefficient of thermal expansion.

In one aspect, the present invention relates to a curable potting composition, comprising:

- a multifunctional acetoacetate compound,
- a (meth)acrylate compound having at least three (meth) acrylate groups,
- a catalyst, and
- a filler,
- wherein the equivalent ratio of the (meth)acrylate compound having at least three (meth)acrylate groups to the multifunctional acetoacetate compound is more than 1.5.

In another aspect, the present invention relates to a two-part curable potting composition, comprising,

- a first part comprising a multifunctional acetoacetate compound, and
- a second part comprising a (meth)acrylate compound having at least three (meth)acrylate groups, wherein at least one of the first part and the second part further comprises a catalyst, wherein at least one of the first part and the second part further comprises a filler, and wherein the equivalent ratio of the (meth)acrylate compound having at least three (meth)acrylate groups to the multifunctional acetoacetate compound is more than 1.5.

In yet another aspect, the present invention relates to the use of the curable potting composition or the two-part curable potting composition in electronic devices.

Further preferred embodiments of the invention are set out in the claims.

In the present specification, the terms "a" and "an" and "at least one" are the same as the term "one or more" and can be employed interchangeably.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

"Essentially no (a substance)", as used herein, refers to the fact that the substance is not intentionally added in the formulating of the curable potting composition, only exists in a small amount in the curable potting composition and does not impair the performance of the potting composition. In a preferred embodiment, the curable potting composition comprises no such component. However, as a very small amount of such substance may unavoidably exist as for example impurity in the components added for purpose, in another embodiment, the curable potting composition comprises no more than 1%, preferably no more than 0.1% by weight of the composition of such substances.

If reference is made herein to a molecular weight of a polymer or its components, this reference refers to the average number molecular weight Mn, if not explicitly stated otherwise. The number average molecular weight Mn can be calculated based on end group analysis (OH numbers according to DIN 53240) or can be determined by gel permeation chromatography according to DIN 55672-1: 2007-08 with THF as the eluent. If not stated otherwise, all given molecular weights are those determined by end group analysis. The weight average molecular weight Mw can be determined by GPC, as described for Mn.

All percentages given herein in relation to the compositions or formulations relate to weight % relative to the total weight of the respective composition or formula, if not explicitly stated otherwise.

According to the present invention, the curable potting composition free of SVHC comprises a multifunctional acetoacetate compound, a (meth)acrylate compound having at least three (meth)acrylate groups, a catalyst, and a filler.

The composition includes two or more parts as herein described. The ingredient(s) in each part is stored in a container (part) separate from the others until the contents of all the containers are mixed together to form the mixture of the adhesive composition prior to the application. Upon applying and curing, a solid material forms in the potting area.

Electronic devices are exposed to relatively high working temperatures and repeated temperature cycles from ambient seasonal temperature to high service temperatures (over 100° C.). The main parameters of the materials to guarantee the performance and reliability of the devices include low coefficient of thermal expansion (CTE), or lower than the parts being potted, at the working temperatures, low curing shrinkage, and low warpage. For this reason, it is necessary to use materials with high thermal stability and high Tg (above the working temperatures).

The curable potting composition is formulated to provide a cured product having a Tg no less than 130° C., preferably from 130 to 200° C., and more preferably from 130 to 160° C., measured by DMA.

The curable potting composition is formulated to provide a cured product exhibiting a CTE from 0 to 100, preferably from 15 to 70 μm/m·° C. at 150° C. measured by thermo-mechanical analysis.

The curable potting composition is formulated to provide a cured product exhibiting a weight loss of from 0 to 1.5% under air atmosphere at 180° C., measured by TGA.

The curable potting composition is formulated to provide a cured product exhibiting a warpage of from 0 to 150 μm, and preferably from 0 to 50 μm.

In addition, the curable potting composition has other advantages. For example, the adhesive composition is solvent-free, has a workable viscosity and pot life and also cures quickly. Finally, the curable potting composition provides a strong adhesive bond that is resistant to humidity and chemicals.

In the curable potting compositions of the present invention, the relative proportion of multifunctional (meth)acrylate compound as a Michael acceptor to multifunctional acetoacetate compound as Michael donor can be characterized by the reactive equivalent ratio, which is the ratio of the number of all the functional groups in the curable composition to the number of Michael active hydrogen atoms in the multifunctional acetoacetate compound. The multifunctional (meth)acrylate(s) and multifunctional acetoacetate compound are blended together immediately prior to the application such that the equivalent ratio of the functional (meth)acrylate groups to active hydrogens of the multifunctional acetoacetate compound is more than 1.5, and preferably from 1.6 to 2.0, and more preferably from 1.7 to 1.9. The equivalent ratio used herein is defined the ratio of the number of the (meth)acrylate groups in the multifunctional (meth)acrylate compound to the number of the acetoacetoxy groups in the multifunctional acetoacetate compound.

According to the present invention, the multifunctional acetoacetate compound may have at least two acetoacetoxy groups, preferably 2 to 10 acetoacetoxy groups, and more preferably 2 to 4 acetoacetate groups. As such, this component may comprise either a single compound having at least two acetoacetoxy groups or a mixture of two or more compounds each having at least two acetoacetoxy groups. Each said compound should desirably be characterized by a number average molecular weight (Mn) of less than 12000 g/mol, for example less than 10000 g/mol or less than 6000 g/mol.

In a preferred embodiment, the curable potting composition comprises at least one acetoacetylated polyol, said acetoacetylated polyol being obtainable in accordance with the following equation (Reaction 1):

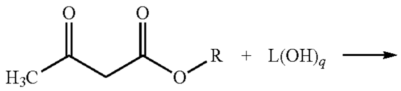

(1)

-continued

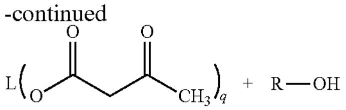

wherein:

R is a $C_1$-$C_{12}$ alkyl group;

L denotes the backbone structure of the polyol; and, q≥2.

Reaction 1 above may be described as the transesterification—or more specifically the transacetylation—of a polyol with an acetoacetate compound as defined in Formula (I) below:

Formula (I)

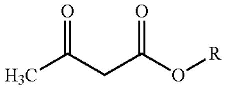

wherein R is said $C_1$-$C_{12}$ alkyl group. More typically, the constituent alkyl group R has from 1 to 8 and, preferably, from 1 to 6 carbon atoms. Exemplary alkyl acetoacetates include: t-butyl acetoacetate; isobutyl acetoacetate; n-butyl acetoacetate; isopropyl acetoacetate; n-propyl acetoacetate; ethyl acetoacetate; and, methyl acetoacetate. t-Butyl acetoacetate is preferred herein.

The polyol of Reaction 1 above is denoted by Formula (II) herein below:

$$L\text{-}(OH)_q \qquad \text{Formula (II)}$$

wherein q≥2 and L denotes the backbone structure. Such polyols (II) may optionally include heteroatoms in their backbone or in pendent side chains. Further, the polyol (II) may be a monomeric polyhydric alcohol or may possess an oligomeric or polymeric backbone. Irrespective of this, it is preferred that the polyol (II) has a number average molecular weight (Mn) of less than 12000 g/mol; and, an hydroxyl functionality, q, of from 2 to 10, preferably from 2 to 4.

In one embodiment, the curable potting composition comprises an acetoacetylated polyol obtained from a monomeric polyhydric alcohol. Examples of suitable monomeric polyhydric alcohols include but are not limited to: 1,2-butanediol; 1,3-butanediol; 1,4-butanediol; 2,3-butanediol; 2,4-pentanediol; butyl ethyl propane diol; 1,4-hexanediol; 1,4-cyclohexane dimethanol; pentaerythritol; dipentaerythritol; trimethylolethane; trimethylolpropane; ditrimethylolpropane; tricyclodecane dimethanol; hydroquinone bis(2-hydroxyethyl) ether; alkylene glycols, such as ethylene glycol, diethylene glycol, propylene glycol, dipropylene glycol, butylene glycol, pentamethylene glycol, hexamethylene glycol, hexylene glycol and neopentyl glycol; glycerol; castor oil; castor wax; sugars such as glucose, sucrose, fructose, raffinose, maltodextrose, galactose, xylose, maltose, lactose, mannose and erythrose; sugar alcohols such as erythritol, xylitol, malitol, mannitol and sorbitol; and, hydroxyalkylated aliphatic diamines such as o,o'-bis(diethanolaminomethyl)-p-nonylphenol, N,N,N,N'-tetra(2-hydroxypropyl)ethylenediamine (Quadrol L, available from BASF) and N,N,N,N-tetra(2-hydroxyethyl)ethylenediamine. In a preferred embodiment, the multifunctional acetoacetate compound is an acetoacetylated polyol obtained from glycerol, trimethylolpropane, ethanol isosorbide, neopentylglycol, pentaerythritol, di-methylolpropane, di-pentaerythritol, propoxylated monosaccharides, trimethylol ethane, and a combination thereof.

The present invention also does not preclude such multifunctional acetoacetate compound from comprising an acetoacetylated polyol obtained from an oligomeric or polymeric polyhydric alcohol. In particular, the polyol (II) may be selected from the group consisting of: polyoxyalkylene polyols, also called polyether polyols; polyester polyols, including polycaprolactone polyols; polyesteramide polyols; polycarbonate polyols; polybutadiene polyols; polyurethane polyols; polyacrylate polyols; and, combinations thereof. Desirably such oligomeric or polymeric polyols should be characterized by: a number average molecular weight (Mn) of at most 10000 g/mol and preferably from 250 to 6000 g/mol. Further, the use of one or more polyether polyols or polyester polyols as the starting material is of particular interest. And a commercial example of a polyether polyol is Voranol CP260 (available from DowDuPont).

As is known in the art, polyester polyols can be prepared from condensation reactions of polybasic carboxylic acids or anhydrides and a stoichiometric excess of polyhydric alcohols, or from a mixture of polybasic carboxylic acids, monobasic carboxylic acids and polyhydric alcohols. Suitable polybasic carboxylic acids and anhydrides for use in preparing the polyester polyols include those having from 2 to 18 carbon atoms and in particular those having from 2 to 10 carbon atoms. Non-limiting examples of such polybasic carboxylic acids and anhydrides include: adipic acid; glutaric acid; succinic acid; malonic acid; pimelic acid; sebacic acid; suberic acid; azelaic acid; 1,4-cyclohexane dicarboxylic acid; phthalic acid; phthalic anhydride; isophthalic acid; terephthalic acid; tetrahydrophthalic acid; hexahydrophthalic acid; and, combinations thereof. Monobasic carboxylic acids which can be used include those having from 1 to 18 carbon atoms or, preferably from 1 to 10 carbon atoms, of which the following examples might be mentioned: formic acid; acetic acid; propionic acid; butyric acid; valeric acid; caproic acid; caprylic acid; capric acid; lauric acid; myristic acid; palmitic acid; stearic acid; and, combinations thereof. Suitable polyhydric alcohols have from 2 to 18 carbon atoms and desirably from 2 to 10 carbon atoms. Exemplary polyhydric alcohols include, but are not limited to: ethylene glycol; propylene glycol; hexene-1,6-diol; trimethylol propane; glycerol; neopentyl glycol; pentaerythritol; butylene glycol; 2-methyl-1,3-propane diol; hexylene glycol; and, combinations thereof.

Polyether polyols may be produced by processes known in the art, such as the reaction of alkene oxides with polyhydric starter molecule in the presence of an appropriate catalyst, such as an alkali metal hydroxide, alkali metal alkoxide or antimony pentachloride. Examples of the alkene oxides include: tetrahydrofuran; ethylene oxide; 1,2-propylene oxide; 1,2- and 2,3-butylene oxide; and, styrene oxide. And examples of suitable starter molecules include but are not limited to: water; ethylene glycol; 1,2- and 1,3-propanediols; 1,4-butanediol; diethylene glycol; and, trimethylolpropane. Preferred polyether polyols for use herein are: poly(propylene oxide) polyol; poly(ethylene oxide) polyol; PTMEG; and, mixtures thereof.

Polycarbonate polyols for use herein can be selected from, but are not limited to polycarbonate diols. Such polycarbonate diols may be produced by the reaction of a diol with dialkyl or diaryl carbonates or phosgene. The reactant diols may be selected from, but are not limited to: 1,2-propanediol; 1,3-propanediol; 1,4-butanediol; 1,5-pentanediol; 1,6-hexanediol; diethylene glycol; trioxyethylene glycol; and, mixtures thereof. An exemplary diaryl carbonate is diphenyl carbonate.

The transesterification (transacetylation) Reaction 1 may be conducted by conventional methods as known in the art of polymer chemistry. Reference in this regard may be made to inter alia: Witzman et al. "*Comparison of Methods for the Preparation of Acetoacetylated Coating Resins*", Journal of Coatings Technology, Vol. 62, No. 789, October 1990; and, Witzeman et al. "*Transaoetoacetylation with tert-butyl acetoacetate: Synthetic Applications*", J. Org. Chemistry 1991, 56, 1713-1718. Typically, the reaction between the oligomeric or polymeric polyol and the acetoacetate will involve mixing said polyol and acetoacetate in a suitable vessel, either with or without solvent, at an elevated temperature of, for example, from 50° to 200° C. or from 80° to 150° C.; preferably, the reaction is performed in the absence of solvent. The reaction is driven towards completion by distilling off the alcohol (R—OH) formed under reduced pressure. Moreover, the reaction can be conducted in the presence of a catalytic amount of a transesterification catalyst of which suitable examples include, but are not limited to, calcium acetate, zinc acetate, bismuth acetate, lead oxide and trichloroacetic acid.

The reaction should proceed to at least 99% conversion of the hydroxyl groups into acetoacetoxy functional groups: this degree of conversion can be monitored and confirmed by 1H-NMR and TLC. Whilst the reactants may be used in amounts such that one OH group is present for each acetoacetoxy group, it is also preferred to use a molar excess of the acetoacetate to ensure complete reaction.

Whilst the product of the above described transacetylation reaction may be used directly in the present potting composition, that reaction product may equally be first isolated and purified using methods known in the art. Mention in this regard may be made of extraction, evaporation, distillation and chromatography as suitable techniques.

According to the present invention, the multifunctional (meth)acrylate compound has at least three (meth)acrylate groups, preferably at least four (meth)acrylate groups, and preferably 4 to 6 (meth)acrylate groups. It has been surprisingly found that such high functional (meth)acrylate compound can achieve a high crosslinking density for the cured product which in turn shows excellent glass transition temperature, CTE, warpage, etc. and is suitable to be used as potting material.

Examples of the multifunctional (meth)acrylate compound include, but are not limited to trimethylolpropane tri(meth)acrylate, ethoxylated trimethylolpropane tri(meth) acrylate, propoxylated trimethylolpropanetri(meth)acrylate, trimethylolpropanetri(meth)acrylate, pentaerythrtoltetra(meth)acrylate di-trimethylolpropanetertra(meth)acrylate, di-pentaerythritolhexa(meth)acrylate, di-pentaerthritolpenta (meth)acrylate, ethoxylated trimethylolpropane tri(meth) acrylate, or a combination thereof, among others. One or more embodiments of the present invention provide the multifunctional acrylate compound is selected from the group of trimethylolpropanetriacrylate, pentaerythritoltetraacrylate, di-trimethylolpropanetertraacrylate, di-pentaerythritolhexaacrylate, di-pentaerthritolpentaacrylate, ethoxylated trimethylolpropane triacrylate, and combination thereof.

Catalyst are used in the present potting composition to generate the Michael addition reaction between the multifunctional acetoacetate compound and (meth)acrylate compound having at least three (meth)acrylate groups under a temperature such as from room temperature to 200° C., preferably from 100 to 180° C. to form a potting material having high crosslinking density.

Examples of the suitable catalyst in the present invention are, among others, 1,5-diazabicyclo[4.3.0]non-5-ene (DBN), triazabicyclodecene (TBD), tetramethylguanidine (TMG), trioctylphosphine (TOP), triphenylphosphine (TPP), (tetrabutylammonium hydroxide) TBAOH, NaOH, KOH, NaOEt, KOEt, phosphazanes and combination thereof.

The molar ratio of the catalyst to the multifunctional acetoacetate compound is from 0.01 to 5, and preferably from 0.05 to 1.

Fillers must be contained in the present curable potting composition to achieve a variety of determinant properties such as coefficient of thermal expansion, shrinkage, warpage and electrical insulation for the potting material. The fillers should typically be included in an amount of 50 to 90% and preferably, 65% to 80% by weight of the curable potting composition. Suitable for use as fillers herein are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler. In one preferred embodiment, the filler is selected from silica, fused silica, fumed silica, alumina, aluminum nitride, calcium carbonate, and combination thereof.

Preferably, the present curable potting composition comprises essentially no, preferably less than 0.1% by weight of the composition, and more preferably no, Substances of Very High Concern according to the EU REACH Regulation and carcinogenic, mutagenic or reprotoxic compounds according to the EU CLP Regulation. Examples of such substances include those commonly used in the potting material such as DBU and isocyanate.

In another aspect, the present invention is directed to a two-part curable potting composition, comprising,

- a first part comprising a multifunctional acetoacetate compound, and
- a second part comprising a (meth)acrylate compound having at least three (meth)acrylate groups,
- wherein at least one of the first part and the second part further comprises a catalyst,
- wherein at least one of the first part and the second part further comprises a filler, and
- wherein the equivalent ratio of the (meth)acrylate compound having at least three (meth)acrylate groups to the multifunctional acetoacetate compound is more than 1.5.

The compositions of the present invention may, of course, also contain standard additives for potting compositions such as pigments, plasticizers, levelling agents, foam suppressing agents, rheology control agents, anti-oxidants, tackifiers, adhesion promoters, epoxy resins and, UV-stabilizers. The choice of appropriate additives and the usage amount is limited only in that these must be compatible with the other components of the composition and cannot be deleterious to the use of the composition in potting applications. In case of a two-part composition, the additives may be disposed in either part or both parts of the composition. On the other hand, the present curable potting composition comprises essentially no, preferably no additives which are not commonly used in potting materials such as surfactant and blowing agent.

The curable potting composition according to the present invention is suitable to be used in the manufacturing of electronic devices such as bare dies, e.g. metal-oxide-semiconductor field-effect transistors (MOSFET), insulated-gate bipolar transistors (IGBT), diodes, light emitting diodes (LED), and the like.

The present disclosure may be further understood with reference to the following examples. These examples are intended to be representative of specific embodiments of the disclosure and are not intended to be limiting to the scope of the disclosure.

EXAMPLE

Materials 1,6-Hexanediol diacrylate was obtained from Aldrich.

1,5-Diazabicyclo[4.3.0]non-5-ene (DBN) was obtained from Aldrich.

Trioctylphosphine (TOP) was obtained from Alfa Aesar.

Fused silica was obtained under the trade name of Denka FB-35 from Denka.

Silane coupling agent was obtained under the trade name of Silane A147 from Alfa Aesar.

Epoxy resin was obtained under the trade name of Synasia S-720 from Nantong Synasia.

Test Methods

Conversion

The conversion was followed by FTIR through the disappearance of the acrylate band situated at 810 cm-1. Infrared spectra were recorded on a PerkinElmer UATR Two—FT IR spectrometer. Spectra were recorded of either neat or in thin films.

Differential scanning calorimetry (DSC) with a DSC Q1000 from TA Instruments. For the analysis the sample is submitted to two heating cycles and one cooling between them, using a heating/cooling rate of 10° C./min under nitrogen atmosphere from 30° C. to 250° C. The reported glass transition data was obtained from the second heating cycle from DSC.

Tg Determination Using DMA Analysis

Tg of materials was determined using a DMA Q800 equipment from TA instruments. A specimen of 30×10×3 mm was prepared in the suitable mold and heated from 0° C. to 250° C. with the ramp temperature of 2° C./min using a frequency of 1 Hz and strain level of 0.1%. The Tg was calculated from the damping coefficient (tan θ) versus temperature.

CTE Determination Using TMA Analysis

Thermomechanical analysis (TMA) from TA instrument equipment was used for the coefficient of thermal expansion (CTE) determination. TMA determined the dimension change (μm) of a sample under pressure as function of temperatures. The probe with the specific shape was in contact with the sample films of 20×10×3 mm dimension analyzed with the specific heating rate from 0° C. to 250° C. The reported values of CTE are expressed in μm/(m·° C.).

Weight Loss Determination Using TGA Analysis

The weight loss was determined by thermogravimetric analysis using a TGA Q500 equipment from TA instruments. The sample was heated from 30° C. to 400° C. using a heating rate of 10° C./min under air atmosphere. Weight loss is reported at 180° C.

Warpage Determination

The samples were cured on molds of glass-reinforced Teflon PSA tape of about 2 mm thickness and adhered to alumina substrates of 50×50×0.5 mm. After cure the Teflon frame was removed. For the determination of the warpage, the alumina substrate was marked in the center of the substrate, which served as a zero-mark, and two marks on each side. Using an optical microscope Olympus BX51 from Olympus which was equipped with transmitted and reflected light and with a micrometer screw, the warpage was calculated as the difference between the focal distance used to focus the center (zero-mark) and the distance needed to focus the marks in each side.

Synthesis of Acetoacetate Monomers

The synthesis of trimethylolpropane triacetoacetate (AATMP) and pentaerythritol tetraacetoacetate (Penta-aa) was carried out according to literature procedure WO 2019/120923A1 with slight modifications. A 500 mL 3 neck round bottom flask was charged with trimethylolpropane or pentaerythritol (1 eq.) and TBAA (1.1 eq.). Then, a Y-adaptor, mechanical stirring bar and a reflux condenser were adapted in each neck of the flask. In the Y-adaptor a thermocouple and a nitrogen connector were adjusted. The temperature was set to 140° C. under nitrogen atmosphere (reflux reached 92° C. approximately for 4 h). After that, 8 hours distillation was performed at atmospheric pressure while the temperature slowly raised to 140° C. Finally, when the distillation ceased, 2 hours distillation at reduced pressure was done from 900 mbar to 400 mbar at 140° C. The reaction schemes are shown below.

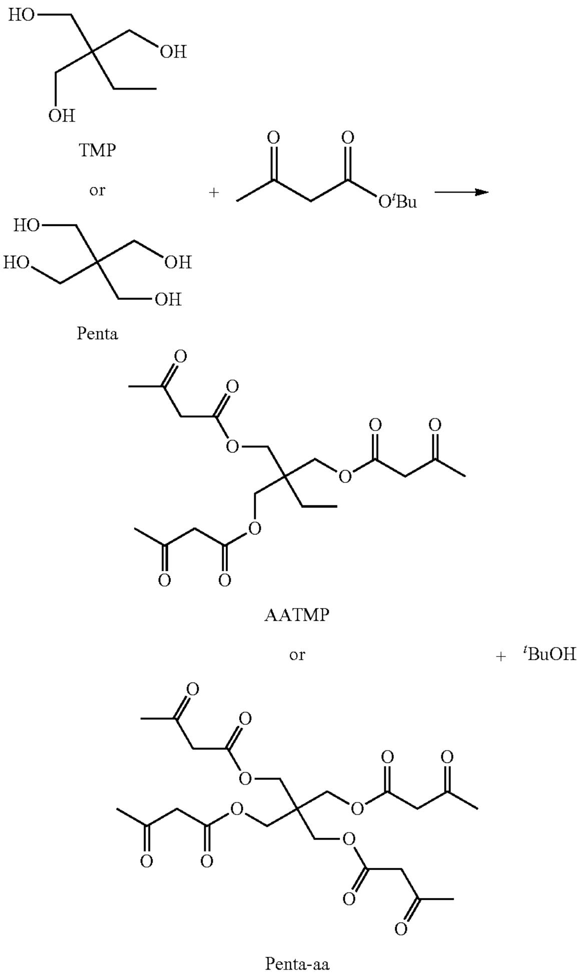
TMP
or
Penta
AATMP
or
+ $^t$BuOH
Penta-aa

Comparative Examples

AATMP (1 g) was premixed with the suitable catalyst and was stirred using a Speed mixer at 3500 rpm for 1-3 min.

Then, 1,6-hexanediol diacrylate was added to the mixture to reach the respective equivalent ratio. The formulation was poured into suitable mold and cured at roam temperature for 4 h.

Table 1 shows the testing results of Tg values and conversion.

TABLE 1

| | Comparative Example 1 | Comparative Example 2 |
|---|---|---|
| Catalyst | TOP | DBN |
| Equivalent ratio | 2 | 2 |
| Tg (° C.) | 25 | 27 |
| Conversion (%) | 80 | 93 |

Comparative Example 3

3.0 g of pentaerythritol tetraacetoacetate and 0.039 g of DBN as Part A were mixed in a speed mixer at 3500 rpm for 3 min. 3.356 g of pentaerythritoltetraacrylate were used as Part B. The two parts were mixed in a speed mixer at 3500 rpm for 1 min. The formulation was then poured into a mould suitable for subsequent test and cured at 150° C. for 1 h. The equivalent ratio of the acrylate to the acetate is 1.5.

Example 1

14.0 g of pentaerythritol tetraacetoacetate and 0.18 g of DBN as Part A were mixed in a speed mixer at 3500 rpm for 3 min. 17.75 g of pentaerythritoltetraacrylate were used as Part B. The two parts were mixed in a speed mixer at 3500 rpm for 1 min. The formulation was then poured into a mould suitable for subsequent test and cured at 150° C. for 1 h. The equivalent ratio of the acrylate to the acetate is 1.7.

Example 2

3.0 g of trimethylolpropane triacetoacetate, 0.029 g of DBN and 10.27 g of fused silica as Part A were mixed in a speed mixer at 3500 rpm for 3 min. 3.818 g of dipentaerythritolhexaacrylate and 10.27 g of fused silica used as Part B were mixed in a speed mixer at 3500 rpm for 3 min. The two parts were mixed in a speed mixer at 3500 rpm for 1 min. The formulation was then poured into a mould suitable for subsequent test and cured at 150° C. for 1 h. The equivalent ratio of the acrylate to the acetate is 1.7.

Example 3

2.7 g of pentaerythritol tetraacetoacetate, 0.035 g of DBN and 9.225 g of fused silica as Part A were mixed in a speed mixer at 3500 rpm for 3 min. 3.423 g of pentaerythritoltetraacrylate, and 9.225 g of fused silica used as Part B were mixed in a speed mixer at 3500 rpm for 3 min. The two parts were mixed in a speed mixer at 3500 rpm for 1 min. The formulation was then poured into a mould suitable for subsequent test and cured at 150° C. for 1 h.

Example 4

3.0 g of trimethylolpropane triacetoacetate, 0.029 g of DBN and 10.27 g of fused silica as Part A were mixed in a speed mixer at 3500 rpm for 3 min. 3.818 g of dipentaerythritolhexaacrylate, and 10.27 g of fused silica used as Part B were mixed in a speed mixer at 3500 rpm for 3 min. The two parts were mixed in a speed mixer at 3500 rpm for 1 min. The formulation was then poured into a mould suitable for subsequent test and cured at 150° C. for 1 h.

Example 5

2.0 g of trimethylolpropane triacetoacetate, 0.019 g of DBN and 7.112 g of fused silica as Part A were mixed in a speed mixer at 3500 rpm for 3 min. 2.558 g of pentaerythritoltetraacrylate, 0.164 g of epoxy resin, 0.038 g of silane coupling agent and 7.112 g of fused silica used as Part B were mixed in a speed mixer at 3500 rpm for 3 min. The two parts were mixed in a speed mixer at 3500 rpm for 1 min. The formulation was then poured into a mould suitable for subsequent test and cured at 150° C. for 1 h.

Example 6

2.0 g of trimethylolpropane triacetoacetate, 0.019 g of DBN and 7.475 g of fused silica as Part A were mixed in a speed mixer at 3500 rpm for 3 min. 2.8 g of dipentaerythritolhexaacrylate, 0.164 g of epoxy resin, 0.04 g of silane coupling agent and 7.475 g of fused silica used as Part B were mixed in a speed mixer at 3500 rpm for 3 min. The two parts were mixed in a speed mixer at 3500 rpm for 1 min. The formulation was then poured into a mould suitable for subsequent test and cured at 150° C. for 1 h.

Tables 2 to 3 show the testing results of the inventive examples. It is evident that the inventive example exhibited excellent Tg, CTE, weight loss and warpage while the comparative examples having difunctional methacrylate as hardener could not achieve a higher Tg and other properties.

TABLE 2

Testing results of Examples 1, 2 and Comparative Example 3 (Ex. 1, Ex. 2 and CEx. 3)

| | Ex. 1 | Ex. 2 | CEx. 3 |
|---|---|---|---|
| Tg value (° C.) | 132 | 133 | 128 |

TABLE 3

Testing results of Examples 3 to 6 (Ex. 3 to Ex. 6)

| | Ex. 3 | Ex. 4 | Ex. 5 | Ex. 6 |
|---|---|---|---|---|
| CTE@100° C. (μm/m · ° C.) | 63 | 52 | 40 [a] | 23 [a] |
| CTE@150° C. (μm/m · ° C.) | 57 | 55 | 58 [a] | 42 [a] |
| CTE@200° C. (μm/m · ° C.) | — | 46 | 56 [a] | 39 [a] |
| Tg value (° C.) | 132 | 133 | 139 | 144 |
| Weight loss @ 180° C. (%) | 0 | 0 | 0.44 | 0.33 |
| Warpage (μm) [b] | 12, 23 [a] | 47, 61 [a] | 12, −28 | 27, −48 |

[a] Alumina substrate was pretreated with 3-aminopropyltrimethoxysilane solution in EtOAC/water, then dried in the oven at 150° C. for 30 min.
[b] The value in either side of the test, and evaluated as acceptable if it is less than 50 μm in absolute value.

What is claimed is:

1. A curable potting composition, comprising:
a multifunctional acetoacetate compound,
a (meth)acrylate compound having at least three (meth) acrylate groups,
a catalyst, and
a filler, wherein the equivalent ratio of the (meth)acrylate compound having at least three (meth)acrylate groups to the multifunctional acetoacetate compound is more than 1.5; and wherein the cured product of the potting composition has a glass transition temperature of greater than 130° C.

2. The curable potting composition according to claim 1, wherein the multifunctional acetoacetate compound has at least two acetoacetate groups.

3. The curable potting composition according to claim 1, wherein the equivalent ratio of (meth)acrylate compound having at least three (meth)acrylate groups to multifunctional acetoacetate compound is from 1.6 to 2.0.

4. The curable potting composition according to claim 1, wherein the multifunctional acetoacetate compound is an acetoacetylated polyol obtained from glycerol, trimethylolpropane, ethanol isosorbide, neopentylglycol, pentaerythritol, di-methylolpropane, di-pentaerythritol, propoxylated monosaccharides, trimethylol ethane, and a combination thereof.

5. The curable potting composition according to claim 1, wherein the (meth)acrylate compound has at least four (meth)acrylate groups.

6. The curable potting composition according to claim 1, wherein the (meth)acrylate compound is selected from trimethylolpropane tri(meth)acrylate, ethoxylated trimethylolpropane tri(meth)acrylate, propoxylated trimethylolpropanetri(meth)acrylate, trimethylolpropanetri(meth)acrylate, pentaerythritoltetra(meth)acrylate di-trimethylolpropanetetra(meth)acrylate, di-pentaerythritolhexa(meth)acrylate, di-pentaerthritolpenta(meth)acrylate, ethoxylated trimethylolpropane tri(meth)acrylate, and combination thereof.

7. The curable potting composition according to claim 1, wherein the catalyst is selected from 1,5-diazabicyclo[4.3.0]non-5-ene (DBN), triazabicyclodecene (TBD), tetramethylguanidine (TMG), trioctylphosphine (TOP), triphenylphosphine (TPP), (Tetrabutylammonium hydroxide) TBAOH, NaOH, KOH, NaOEt, KOEt, phosphazanes and combination thereof.

8. The curable potting composition according to claim 1, wherein the cured product of the potting composition has a glass transition temperature of 130° C. to 200° C.

9. The curable potting composition according to claim 1, wherein the molar ratio of the catalyst to the multifunctional acetoacetate compound is from 0.01 to 5.

10. The curable potting composition according to claim 1, wherein the filler is present in an amount of 50 to 90%.

11. The curable potting composition according to claim 1, comprising essentially no, surfactant.

12. The curable potting composition according to claim 1, comprising essentially no Substances of Very High Concern according to the EU REACH Regulation and carcinogenic, mutagenic or reprotoxic compounds according to the EU CLP Regulation.

* * * * *